United States Patent
Lind et al.

(10) Patent No.: US 7,982,688 B2
(45) Date of Patent: Jul. 19, 2011

(54) DEVICE FOR REPRESENTING OPTICAL INFORMATION BY MEANS OF A VIRTUAL IMAGE, IN PARTICULAR IN A MOTOR VEHICLE

(75) Inventors: Britta Lind, Mainhausen (DE); Bernd Ludewig, Hirschberg (DE); Ralf Mayer, Bolanden (DE)

(73) Assignee: Simens Aktiengesellschaft, München (DE)

( * ) Notice: Subject to any disclaimer, the term of this patent is extended or adjusted under 35 U.S.C. 154(b) by 975 days.

(21) Appl. No.: 11/665,438

(22) PCT Filed: Oct. 12, 2005

(86) PCT No.: PCT/EP2005/055178
§ 371 (c)(1),
(2), (4) Date: Aug. 16, 2007

(87) PCT Pub. No.: WO2006/042814
PCT Pub. Date: Apr. 27, 2006

(65) Prior Publication Data
US 2008/0068296 A1    Mar. 20, 2008

(30) Foreign Application Priority Data
Oct. 15, 2004   (DE) .......................... 10 2004 050 574

(51) Int. Cl.
*G09G 5/00*    (2006.01)
(52) U.S. Cl. .......................................... 345/8; 348/115
(58) Field of Classification Search ............... 345/7–9
See application file for complete search history.

(56) References Cited

U.S. PATENT DOCUMENTS

| | | | |
|---|---|---|---|
| 4,669,810 A | 6/1987 | Wood | |
| 5,200,844 A | 4/1993 | Suvada | |
| 5,231,379 A | 7/1993 | Wood et al. | |
| 5,243,448 A | 9/1993 | Banbury | |
| 5,357,372 A * | 10/1994 | Chen et al. | 359/637 |
| 6,443,573 B2 * | 9/2002 | Aoki | 353/13 |

(Continued)

FOREIGN PATENT DOCUMENTS

DE         693 13 906         10/1993

(Continued)

OTHER PUBLICATIONS

Search Report and Written Opinion dated Jan. 19, 2006 issued for corresponding International Application No. PCT/EP2005/055178.

(Continued)

*Primary Examiner* — Duc Q Dinh
(74) *Attorney, Agent, or Firm* — Cohen Pontani Lieberman & Pavane LLP

(57) ABSTRACT

The invention relates to a device for representing optical information by means of a virtual image (P), in particular in a motor vehicle. The optical information is in the form of light beams extending from an image generating device (1), over at least one optical element to a surface and the virtual image is visible in front of, behind or in said surface. The light beams produce a beam path. Said invention is characterised in that an optical element (4), which influences beams, is arranged in the beam path between the image generating device (1, 2, 3) and the surface (WS), and that the optical element (4), which influences the beams, is arranged in the position thereof such that it can be modified by means of an adjusting device (5).

9 Claims, 4 Drawing Sheets

U.S. PATENT DOCUMENTS

| | | | |
|---|---|---|---|
| 6,771,423 B2 * | 8/2004 | Geist | 359/630 |
| 2003/0016451 A1 | 1/2003 | Aoki | |
| 2003/0165025 A1 | 9/2003 | Eberjardt | |

FOREIGN PATENT DOCUMENTS

| | | |
|---|---|---|
| DE | 101 44 491 | 4/2001 |
| DE | 102 26 896 | 2/2003 |
| EP | 0 151 455 | 8/1985 |
| EP | 0 571 192 | 11/1993 |
| JP | 59 164518 | 9/1984 |
| JP | 60 131328 | 7/1985 |
| JP | 62 182710 | 8/1987 |
| JP | 3-98136 | 10/1991 |
| JP | 7-199115 | 8/1995 |
| JP | 7-290994 | 11/1995 |
| JP | 10-333080 | 12/1998 |
| WO | WO 89/03059 | 4/1989 |
| WO | WO 90/03590 | 4/1990 |

OTHER PUBLICATIONS

Search Report dated Jan. 20, 2005 issued for corresponding DE 10 2004 050 574.8.

* cited by examiner

DEVICE FOR REPRESENTING OPTICAL INFORMATION BY MEANS OF A VIRTUAL IMAGE, IN PARTICULAR IN A MOTOR VEHICLE

CROSS REFERENCE TO RELATED APPLICATIONS

This is a U.S. national stage of application No. PCT/EP2005/055178, filed on 12 Oct. 2005. Priority is claimed on German Application No. 10 2004 050 574.8, filed on Oct. 15, 2004.

BACKGROUND OF THE INVENTION

The invention relates to a device for displaying optical information by means of a virtual image, in particular in a motor vehicle. Devices of this type are known from the prior art, wherein the optical information in the form of light beams from an image generating apparatus can be perceived as a virtual image in front of, behind or in a windshield via at least one mirror surface, with the light beams producing a beam path. The image generating apparatus may comprise, for example, an electron tube, a liquid crystal display (LCD) with an associated light source or organic light-emitting diodes (OLED). In order to be able to compensate both for the image geometry and for the eye-correction parameters, such a astigmatism, disparity and coma, an optical system having a plurality of spatially arranged mirrors with freeform surfaces is used in the prior art. The mirror or mirrors must correct the influence of the curvature of the windshield on the image such that the driver can perceive an undistorted image. Furthermore, the mirror or mirrors magnify the image from the image generating apparatus. Since the windshield contours usually have complex, a symmetric surfaces with variable curvatures, and are therefore also referred to as freeform surfaces, the surfaces of the mirror or mirrors also need to be in the form of freeform surfaces. It is disadvantageous in the presently known devices that they require a large installation space which is available only to a limited extent if the device is used as a head-up display in a motor vehicle, since the device is preferably arranged in the cockpit and the cockpit must provide a very large number of functional elements for the motor vehicle, such as conventional instrumentation, installation space for the on-board electronics and space for ventilation ducts.

SUMMARY OF THE INVENTION

It is therefore an object of the invention to specify a device for displaying optical information by means of a virtual image, in particular in front of, behind or on a surface, in particular the windshield of a motor vehicle, which device occupies less space than known head-up displays with mirror optics. This is achieved by arranging an optical element (SOE) influencing the beam path in the beam path downstream of the image generating apparatus and upstream of the surface, and arranging the optical element influencing the beam path such that its position can be changed. This achieves a particularly compact design of the head-up display. It is furthermore advantageous here that tolerances, tolerances of the windshield and tolerances of the framework of the windshield, can be compensated for in the vehicle and an undistorted image can thus be perceived using simple means. The ability to vary the position of the optical element influencing the beam path is achieved in a particularly simple manner by arranging the element in a variable position.

Additional degrees of freedom can be obtained by the capability to rotate the optical element influencing the beam path. When a diffractive optical element is used as the optical element influencing the beam path, it is possible to eliminate distortion in a particularly effective manner and the position can be changed in a particularly simple manner on account of the light weight of the diffractive optical element.

The distortion can be corrected in a particularly simple manner by arranging a second diffractive optical element downstream of a first diffractive optical element. If the position of this second diffractive optical element can also be changed, the degree of influence is even larger. A simple design is provided in particular in the case of a device in which the two diffractive optical elements are arranged on planes which are moved parallel to one another. If the two diffractive optical elements can be moved in different directions, capability for adaptation to tolerances that occur is simplified further.

It is also possible for a catadioptric element rather than the diffractive optical element or in addition to the diffractive optical element to be provided as the optical element influencing the beam path.

If one or more additional mirrors is or are arranged in the beam path between the image generating apparatus and the surface, firstly the beam path can be folded and thus a compact device be achieved and secondly the matching to the windshield can be further improved if one or more of the mirrors is aspherical.

Additional diffractive optical elements can be used to further shorten the beam path and to achieve an even more compact design. In certain embodiments, it may be sufficient to arrange only one diffractive optical element as the effective optical means between the image generating apparatus and the surface. A device according to the invention, and of very simple and compact design, can thus be achieved.

BRIEF DESCRIPTION OF THE DRAWINGS

The invention is described in further detail below with reference to the drawings, in which.

DETAILED DESCRIPTION OF THE PRESENTLY PREFERRED EMBODIMENTS

Figure 1:
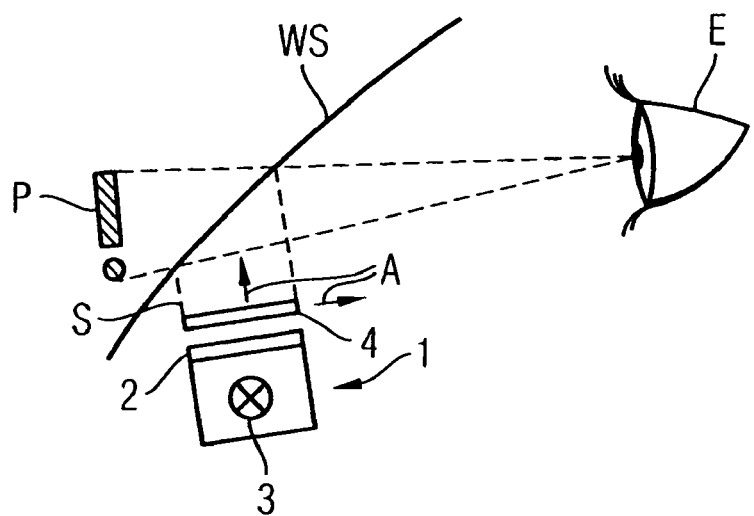
FIG. 1 shows a section through a first exemplary embodiment of a device according to the invention.

FIG. 1 shows an image generating apparatus 1, comprising a liquid crystal display 2 and a light source 3, a diffractive optical element 4, a windshield WS, an imaginary image P and an eye E of an observer. Light beams from the light source 3 pass through the LCD 2. These beams S pass through the diffractive optical element 4 and are reflected by the windshield WS to the eye E of an observer, with the result that the latter can perceive the virtual image P outside the windshield. The diffractive optical element 4 is arranged such that its height and width extent can be adjusted, as indicated by arrows A. This ability of the diffractive optical element to be adjusted can be used to achieve an undistorted display of the virtual image P.

Figure 2:
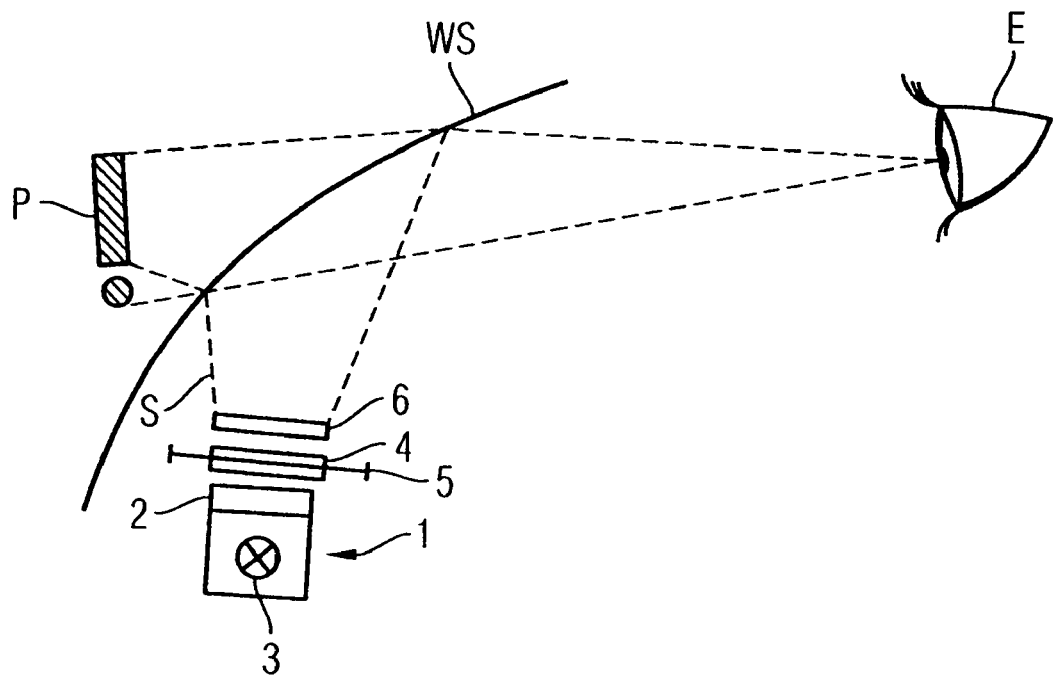
FIG. 2 shows a section through a second exemplary embodiment of a device according to the invention.

In FIG. 2, an adjustment apparatus 5 and a second diffractive optical element 6 are arranged in addition to the elements known from FIG. 1. The diffractive optical element 4 is arranged such that it can be adjusted by the adjustment apparatus 5. The second diffractive optical element 6 widens the beams S even further, with the result that the virtual image P appears even larger to the eye E of the observer.

Figure 3:
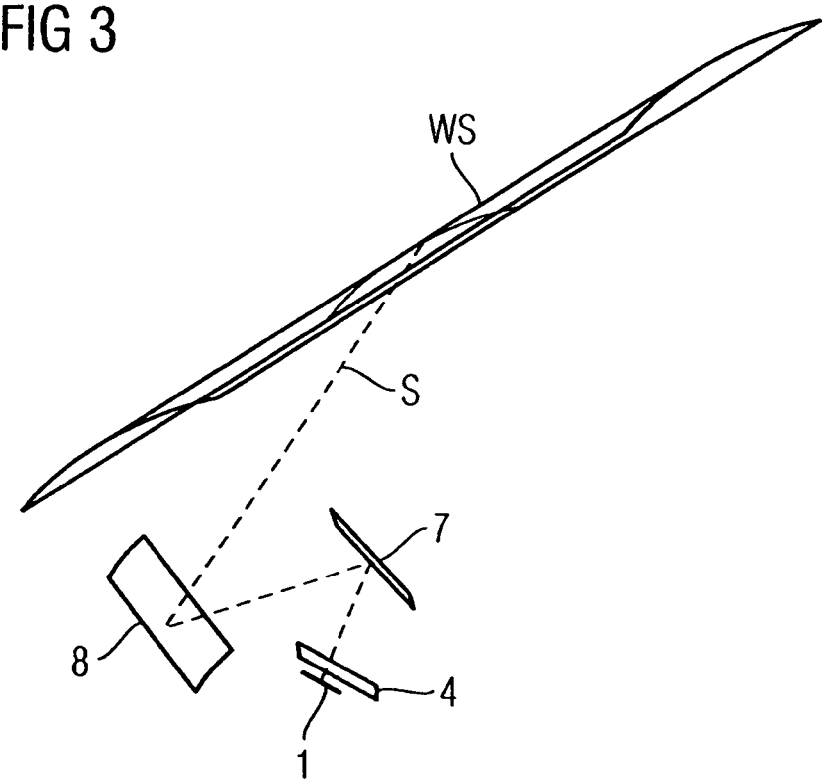
FIG. 3 shows a third exemplary embodiment of a device according to the invention.

FIG. 3 shows, besides an image generating apparatus 1 and a diffractive optical element 4, a mirror 7 and an aspherical mirror 8. The light beams produced in the image generating apparatus 1 arrive on the windshield through the diffractive optical element 4 and the mirror 7 and the aspherical mirror 8. The ability of the diffractive optical element 4 to be adjusted allows compensation for the tolerances of the windshield WS.

Figure 4:
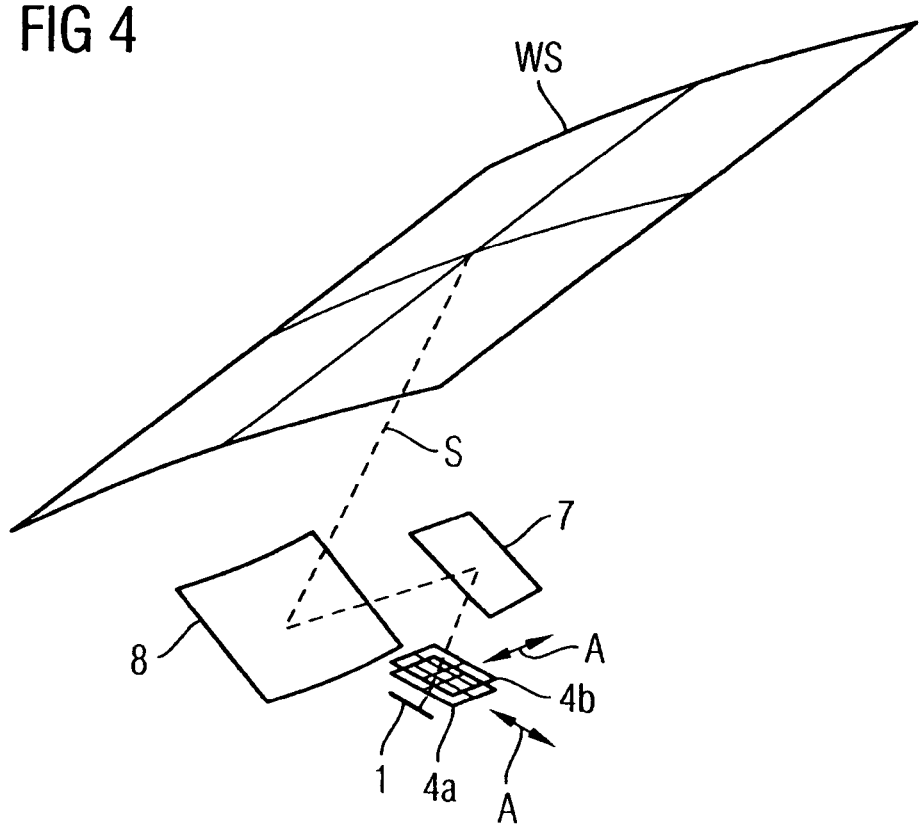
FIG. 4 shows a fourth exemplary embodiment of a device according to the invention.

FIG. 4 shows, besides the image generating apparatus 1, two diffractive optical elements 4a, 4b which are arranged one above the other, a mirror 7, an aspherical mirror 8 and the windshield WS. The two diffractive optical elements 4a, 4b are arranged one above the other, with the positions of the planes being shifted parallel. The two diffractive optical elements 4a, 4b can be adjusted in different directions, as illustrated by the arrows A. The ability to be moved in different directions achieves particularly optimum matching to the windshield WS.

Figure 5:
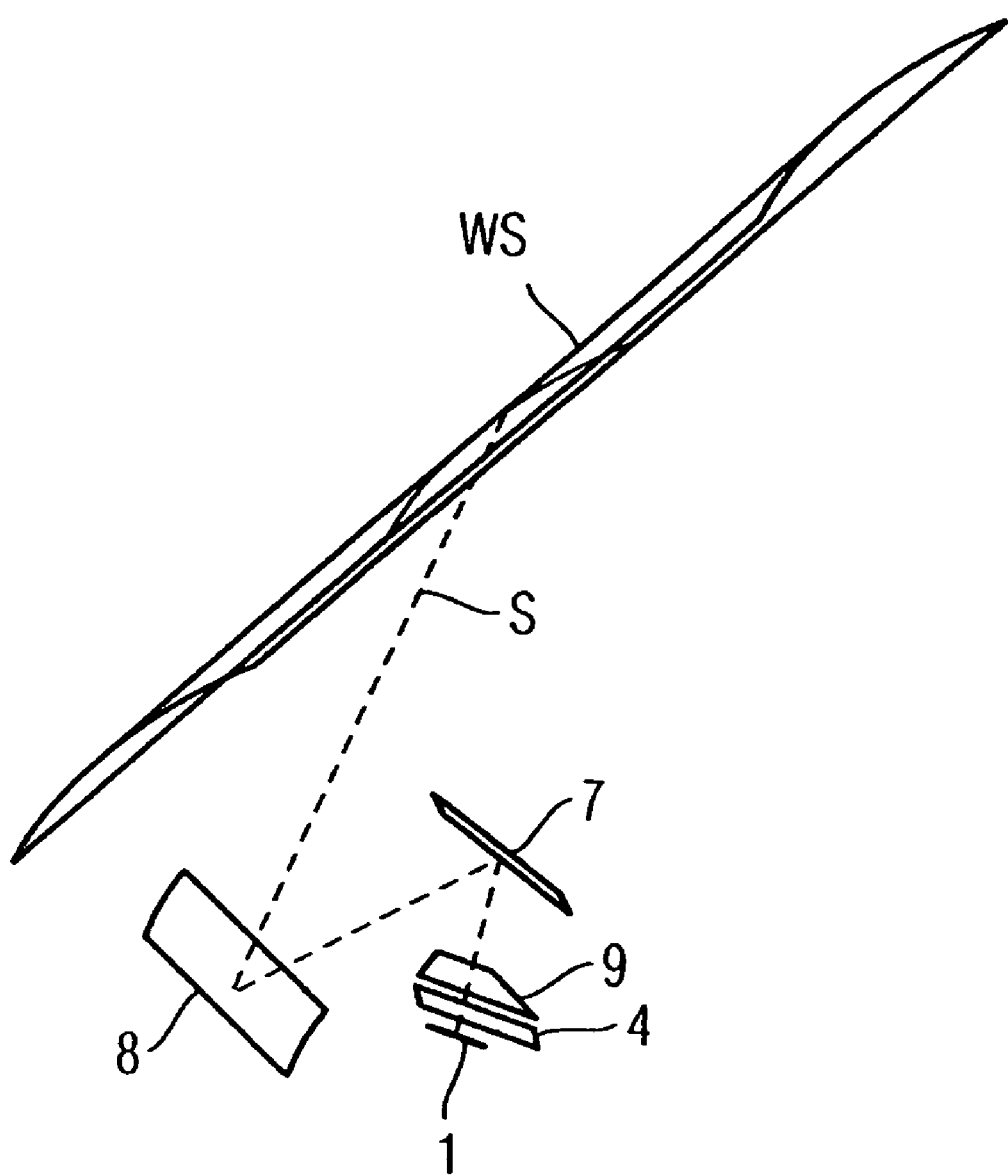
FIG. 5 shows a fifth exemplary embodiment of a device according to the invention.

In FIG. 5, besides the elements known in FIG. 4, a lens 9, which is arranged in the beam path between the diffractive optical element 4 and the mirror 7, is arranged. The lens 9 allows shortening and additional optical matching to the geometry of the windshield.

Figure 6:
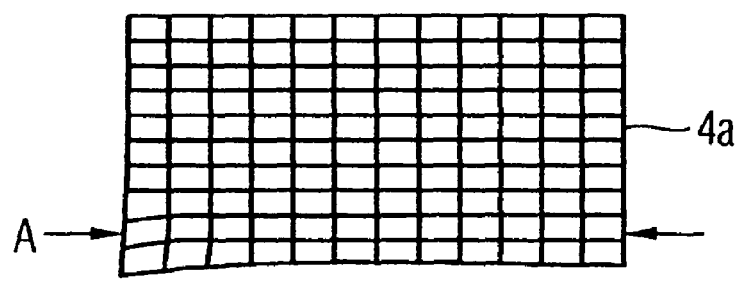
FIG. 6 shows the plan view of a diffractive optical element.

The exemplary embodiment of a diffractive optical element in FIG. 6 has, in the plan view, grating lines separating individual segments of the diffractive optical element 4a from one another. It can also be seen that the diffractive optical element 4a is designed such that it is not purely rectangular, but is rather matched appropriately to the curvature of a windshield for which the diffractive optical element 4 is to be used.

Figure 7:
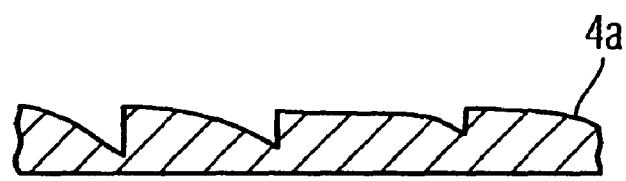
FIG. 7 shows a partial section A from FIG. 5.

FIG. 7 shows a partial section A from FIG. 6. The diffractive optical element 4a is in the form of a Fresnel lens, with the asymmetric design at least partially compensating for the aspherical shape of the windshield WS.

Figure 8:
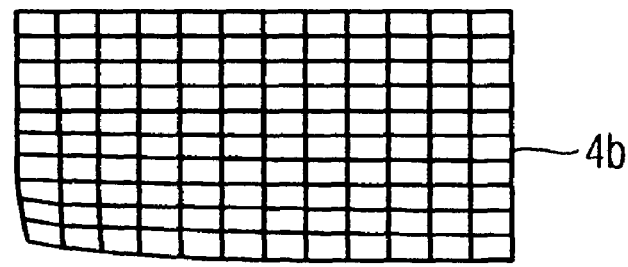
FIG. 8 shows the plan view of a second diffractive optical element.

FIG. 8 shows the plan view of the second diffractive optical element 4b. Once again, this shows that the diffractive optical element 4b is not purely rectangular, so that the curvature of the windshield can be optimally compensated for.

It is advantageous even for devices without aspherical mirror elements for a device according to the invention to have with two diffractive optical elements which are arranged such that they can be moved with respect to one another. By way of example, the diffractive optical element 6 in FIG. 2 can also be designed such that it can be adjusted.

By way of example, a cathode ray tube or an arrangement of organic light-emitting diodes or other light-emitting diodes can also be used instead of an LCD for the image generating apparatus 1. It is also possible for a catadioptric mirror to be used instead of the mirrors 7 and 8 in the exemplary embodiments in FIGS. 3 and 4, in which catadioptric mirror an optical medium other than air, for example glass or a light-guiding base material, is arranged in the beam path upstream of the mirror surface. Finally it is also possible for a catadioptric mirror, instead of the diffractive optical element 4, to be arranged in the beam path such that it can be adjusted.

What is claimed is:

1. A device for displaying optical information, comprising:
   an image generating apparatus emitting optical information in the form of light beams;
   a surface, wherein the light beams arrive at the surface such that a virtual image of the optical information is perceivable in front of, behind, or in the surface;
   a first diffractive optical element arranged in a beam path of the light beams between the image generating apparatus and the surface, said first diffractive optical element influencing the beam path of the light beams;
   a second diffractive optical element arranged on a plane parallel to a plane of the first diffractive optical element and downstream of the first diffractive optical element along the beam path; and
   an adjustment apparatus operatively connected to at least one of the first and second diffractive optical elements for adjusting a position of the at least one of the first and second diffractive optical elements to minimize distortion of the virtual image,
   wherein the first and second diffractive optical elements are movable parallel to one another.

2. The device of claim 1, wherein the at least one of the first and second diffractive optical elements is arrangeable in a variable position.

3. The device of claim 1, wherein the at least one of the first and second diffractive optical elements is rotatable.

4. The device of claim 1, wherein the first and second diffractive optical elements are movable in different directions.

5. The device of claim 1, wherein at least one of the first and second diffractive optical elements is a catadioptric element.

6. The device of claim 1, further comprising a mirror arranged in the beam path between the image generating apparatus and the surface.

7. The device of claim 5, further comprising a mirror arranged in the beam path between the image generating apparatus and the surface.

8. The device of claim 1, further comprising a catadioptric element arranged between the image generating apparatus and the surface.

9. The device of claim 1, further comprising a lens or lens segment arranged between the image generating apparatus and the surface.

* * * * *